F. U. WILLIAMS.
ATTACHMENT FOR LENSES.
APPLICATION FILED APR. 21, 1909.
953,879.
Patented Apr. 5, 1910.
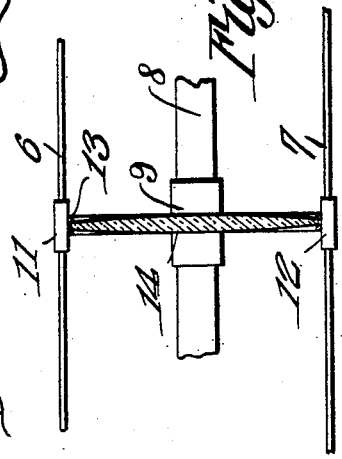
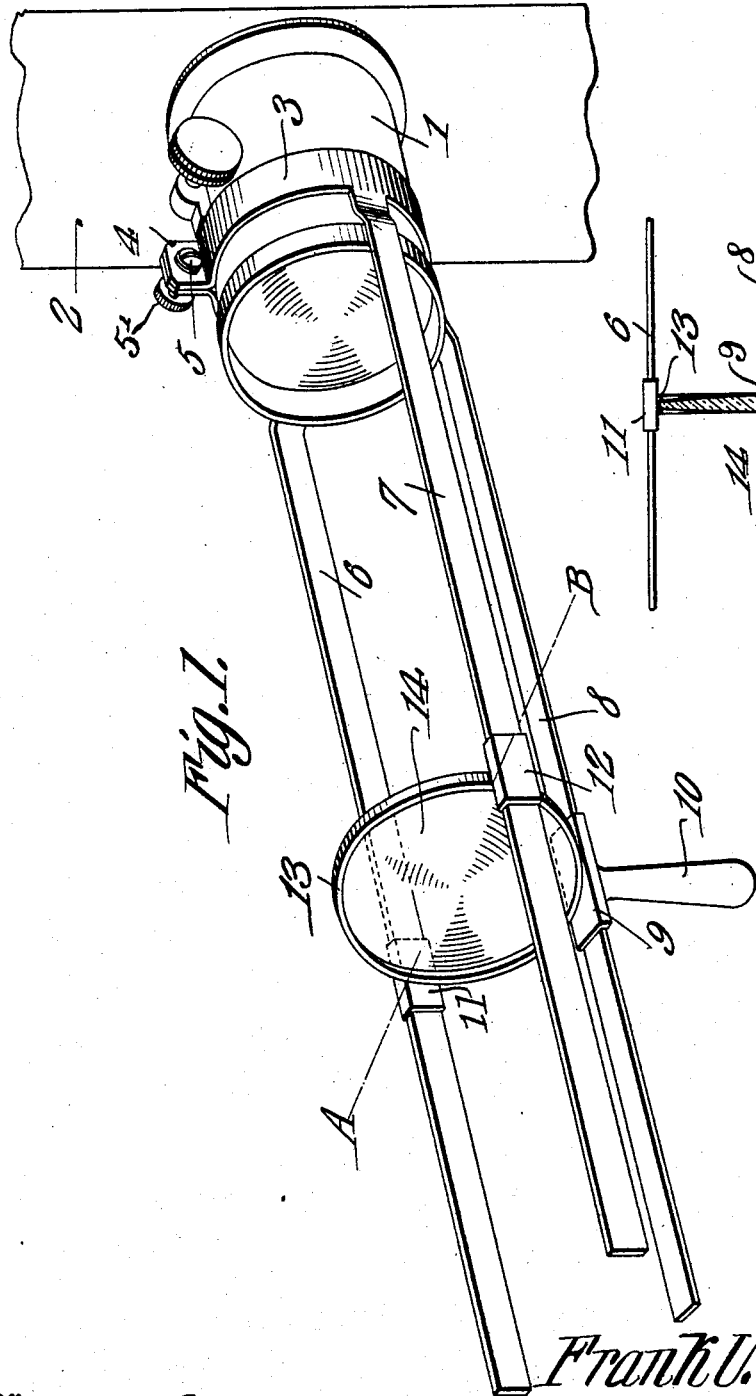
Inventor
Frank U. Williams.
By C. A. Snow & Co.
Attorneys
Witnesses

UNITED STATES PATENT OFFICE.

FRANK ULRIC WILLIAMS, OF CARTHAGE, MISSOURI.

ATTACHMENT FOR LENSES.

953,879.  Specification of Letters Patent.  Patented Apr. 5, 1910.

Application filed April 21, 1909. Serial No. 491,252.

*To all whom it may concern:*

Be it known that I, FRANK ULRIC WILLIAMS, a citizen of the United States, residing at Carthage, in the county of Jasper and State of Missouri, have invented a new and useful Attachment for Lenses, of which the following is a specification.

This invention has reference to improvements in attachments for lenses and is designed more especially for use in connection with projection lenses whereby a lens constructed to produce a certain size picture upon a screen at a certain distance therefrom may be made to produce upon the screen pictures of other sizes without changing the distance of the lens from the screen, or may be made to produce pictures of the same size upon the screen at varying distances therefrom.

Projection lenses are usually made in several sizes capable of producing the same size picture on the screen at different distances therefrom, the amount of light transmitted through one lens when located at a distance from the screen to produce a certain size picture being approximately the same as the amount of light transmitted through another lens situated at a correspondingly different distance from the screen and producing the same size picture as the first lens. An operator must therefore be provided with several different lenses in order to produce a picture on the screen of a certain size if under differing circumstances it becomes necessary to situate the projection apparatus at a greater or less distance from the screen.

With the present invention, the rays of light leaving the lens in the direction toward the screen may be expanded or compacted to produce a larger or smaller picture as desired without the necessity of moving the projection apparatus, or the same size picture may be produced at varying distances from the screen.

The invention will be best understood from a consideration of the following detail description taken in connection with the accompanying drawings forming a part of this specification, in which drawings, Figure 1 is a perspective view of the attachment as applied to a projection lens. Fig. 2 is a section on the line A—B of Fig. 1.

Referring to the drawings there is shown a projection lens 1 which may be considered as attached to the front board 2 of a projection apparatus which latter may also be considered as of the motion picture type although the invention is not confined to a motion picture projection machine but may be used in connection with a stereopticon or with other lenses than projection lenses.

There is provided a clip 3 in the form of a clamp band adapted to encircle the barrel of the lens 1 and this band may be made of a single strip bent into circular form and having the meeting ends bent into parallel relation as shown at 4, these ends being perforated for the passage of the clamp bolt 5 carrying a nut 5' which may be in the form of a thumb or wing nut for ready manipulation. The length of the band 3 is such that when encircling the barrel of the lens 1 and the clamp nut 5' is tightened the ends 4 are brought into close relation and thereby the band 3 is firmly clamped to the barrel of the lens 1.

The clamp band 3 is formed with or has attached to it strips 6, 7 and 8, the strips 6 and 7 being in parallel relation and attached to or formed on the band 3 at diametrically opposite points thereon. The strip 8 projects in the same direction as the strips 6 and 7 but is displaced 90° from each. Of course other relations of these strips may be provided.

Mounted on the strip 8 is a slide 9 provided with a handle 10 projecting in a direction away from the strips 6 and 7. These strips 6 and 7 each carry a respective slide 11—12 and the three slides 9, 11, 12 are connected by an annular band or ring 13. Secured in the ring 13 is a lens 14 so related to the optical parts of the lens 1 that on being moved toward or from the said lens 1 the light rays passing through the lens 1 are caused to diverge or to approach in accordance with the direction of movement of the lens 14 with relation to the lens 1 and so the image produced on the screen is enlarged or contracted without the necessity of moving the projection apparatus with relation to the screen upon which the picture is produced.

The arms or strips 6, 7 and 8 serve to guide the lens 14 in its movement to and from the lens 1.

It will be observed that the strips 6 and 7 are set on edge in vertical planes while the strip 8 lies flat in a horizontal plane. Any tendency therefore of the strips 6 and 7 to bend horizontally is resisted by the strip 8 which is wide in the direction of such movement, while any tendency of the strip 8 to bend up or down is resisted by the strips 6 and 7 which are on edge to resist movement in this direction. The three arms 6, 7 and 8 therefore together resist any movement of the lens 4 out of the optical axis of the lens 1. It will be observed that two arms or strips 6 and 7 are used to the one arm 8. This is because of the weight of the lens 14 tending to bend the arm or strip 8 and this tendency is more effectually resisted by having the two arms or strips 6 and 7, besides the three strips act as efficient guides permitting the easy movement of the lens 14 without binding and yet without lost motion.

The operator may readily adjust the lens 14 with relation to the lens 1 by grasping the handle 10 and moving the lens 14 to or from the lens 1 as may be found necessary.

If the lens 1 be a one-quarter lens then by the use of the lens 14 this one-quarter lens may be converted into a two-quarter or a three-quarter or a four-quarter lens while all intermediate points are also covered.

If it be necessary to place the projection apparatus close to the screen then the light rays may be caused to expand thus producing upon the screen an image of the desired size. If it be necessary to place the projection apparatus farther away from the screen then the light cone may be contracted to adapt the image to the screen. Thus with a single projection lens 1 the same size image may be produced upon the screen at varying distances of the projection apparatus from the screen, or larger or smaller images may be produced with the one projection lens with the projection apparatus at the same distance from the screen.

Projection lenses vary in price in accordance with the size and focal length, the larger size lenses being considerably more expensive than the smaller size. With the present invention the short focus lens and therefore a comparatively cheap lens may be made to take the place of a complete battery of lenses, with the added advantage of having an indefinite number of intermediate adjustments not possible with projection lenses as manufactured.

While the present invention has been described as applied to a projection lens it will be understood that it is also applicable to other lenses and may operate in the reverse direction as for instance in the case of a photographic lens, the lens 14 may be placed in front of the photographic lens so as to modify the image acting on the photographic plate.

What is claimed is:—

1. An attachment for lenses comprising a holding member adapted to be secured to a lens barrel, a carrier slidable on the holder, and a light modifying element mounted in the carrier in fixed relation thereto, said carrier with the light modifying element therein being adapted to be moved to and from the lens bodily in the optical axis of said lens to vary the size of the image produced by the lens.

2. An attachment for lenses comprising a clamp band adapted to encircle a lens barrel and having arms projecting therefrom parallel with the optical axis of the lens, a carrier sustained by the arms and slidable longitudinally thereon, and a lens mounted in said carrier.

3. An attachment for lenses comprising a clamp band adapted to encircle the barrel of a lens and having arms projecting therefrom in spaced relation one to the other and parallel with the optical axis of the lens, the arms coacting to resist bending out of parallelism with the optical axis of the lens, another lens coacting with the first named lens to modify the light rays to a different extent than the first named lens, and a carrier for the second named lens having sliding members connected together and on and movable along respective ones of the arms carried by the clamp band.

4. An attachment for lenses comprising a plurality of arms connected together at one end and adapted to be applied to the barrel of a lens in parallel relation with the optical axis of the lens, and a sliding lens carrier connecting and movable along said arms in the direction of the length of the latter.

In testimony that I claim the foregoing as my own, I have hereto affixed my signature in the presence of two witnesses.

FRANK ULRIC WILLIAMS.

Witnesses:
E. M. BRONSON,
L. W. BARRETT.